US012553616B2

(12) United States Patent
Andruszkiewicz et al.

(10) Patent No.: US 12,553,616 B2
(45) Date of Patent: Feb. 17, 2026

(54) DOOR LATCH FOR AN APPLIANCE

(71) Applicant: WHIRLPOOL CORPORATION, Benton Harbor, MI (US)

(72) Inventors: Matthew Chester Andruszkiewicz, Niles, MI (US); Rohan Gajanan Gore, Stevensville, MI (US); Sarang Hemant Lokaksha, Pune (IN); Suraj Ganpatrao Patil, Solapur (IN); Yogesh Sonone, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 77 days.

(21) Appl. No.: 18/443,893

(22) Filed: Feb. 16, 2024

(65) Prior Publication Data

US 2025/0264223 A1 Aug. 21, 2025

(51) Int. Cl.
*F24C 15/02* (2006.01)
*E05B 65/00* (2006.01)
*F24C 14/00* (2006.01)

(52) U.S. Cl.
CPC ............ *F24C 15/022* (2013.01); *E05B 65/00* (2013.01); *F24C 14/00* (2013.01)

(58) Field of Classification Search
CPC ...... F24C 15/022; F24C 15/028; F24C 14/00; E05B 65/00
See application file for complete search history.

(56) References Cited

U.S. PATENT DOCUMENTS

| | | | | |
|---|---|---|---|---|
| 3,410,591 | A | 11/1968 | Fowler | |
| 5,004,276 | A | 4/1991 | Hanley | |
| 5,072,974 | A | 12/1991 | Henne | |
| 5,220,153 | A * | 6/1993 | Malone | F24C 15/022 219/412 |
| 6,079,756 | A | 6/2000 | Phillips | |
| 7,040,673 | B2 * | 5/2006 | Smock | F24C 15/022 292/201 |
| 7,137,387 | B2 | 11/2006 | Edwards et al. | |
| 7,225,804 | B2 * | 6/2007 | Simmons, Jr. | F24C 15/022 126/197 |
| 9,958,167 | B2 * | 5/2018 | Lomicka | E05B 53/00 |
| 11,573,009 | B2 * | 2/2023 | Bramhane | E05F 1/12 |

(Continued)

FOREIGN PATENT DOCUMENTS

FR 2398165 A1 2/1979

*Primary Examiner* — Daniel J Rohrhoff
(74) *Attorney, Agent, or Firm* — Price Heneveld LLP

(57) ABSTRACT

A cooking appliance includes an appliance body including a plurality of panels. The plurality of panels includes a front panel and a top panel, where the front panel defines a cavity aperture and a lock aperture. A cooking cavity assembly is disposed within the appliance body, where the cooking cavity assembly defines a cooking cavity. An appliance door includes a door frame defining a latch aperture and a door engagement surface. A door lock assembly is disposed within an electronics cavity and includes a door latch including an arm and a hook end extending from the arm. The hook end defines a latch engagement surface and is configured to engage the door engagement surface. An actuator is configured to rotate the door latch between an unlocked position allowing for selective access of the cooking cavity and a locked position preventing access to the cooking cavity.

17 Claims, 9 Drawing Sheets

(56) References Cited

U.S. PATENT DOCUMENTS

| | | | | |
|---|---|---|---|---|
| 2006/0232077 | A1* | 10/2006 | Courter | F24C 15/022 292/201 |
| 2007/0240699 | A1* | 10/2007 | Welch | F24C 15/022 126/191 |
| 2007/0262590 | A1* | 11/2007 | Courter | F24C 15/022 292/201 |
| 2007/0296224 | A1* | 12/2007 | Courter | E05C 19/10 292/109 |
| 2008/0271727 | A1* | 11/2008 | Collene | F24C 15/022 126/197 |
| 2014/0190083 | A1* | 7/2014 | Lepie | E05B 43/00 49/280 |
| 2017/0328576 | A1 | 11/2017 | Dino | |
| 2021/0215346 | A1* | 7/2021 | Jang | F24C 15/022 |
| 2021/0278090 | A1* | 9/2021 | Ham | E05B 65/00 |
| 2023/0407689 | A1* | 12/2023 | DeYoung | E05C 19/024 |

* cited by examiner

DOOR LATCH FOR AN APPLIANCE

BACKGROUND OF THE DISCLOSURE

The present disclosure generally relates to a door latch for an appliance, and more specifically, to a door latch for a cooking appliance.

SUMMARY OF THE DISCLOSURE

According to one aspect of the present disclosure, a cooking appliance includes an appliance body including a plurality of panels. The plurality of panels includes a front panel and a top panel, where the front panel defines a cavity aperture and a lock aperture. A cooking cavity assembly is disposed within the appliance body, where the cooking cavity assembly defines a cooking cavity, and where an electronics cavity is defined between the top panel of the appliance body and the cooking cavity assembly. An appliance door is operably coupled to the appliance body to allow for selective access to the cooking cavity and includes a door frame defining a latch aperture and a door engagement surface and inner and outer door panels coupled to the door frame. A door lock assembly is disposed within the electronics cavity and includes a door latch including an arm and a hook end extending from the arm. The hook end defines a latch engagement surface and is configured to engage the door engagement surface. The latch engagement surface extends at about an angle of between about 80° to about 90° away from the arm to engage the door frame. An actuator is configured to rotate the door latch between an unlocked position allowing for selective access of the cooking cavity and a locked position preventing access to the cooking cavity by engaging the latch engagement surface with the door engagement surface. The door latch is in the locked position when a cleaning cycle of said appliance is active.

According to another aspect, an oven includes an oven cabinet defining an oven compartment. A door is operably coupled to the oven cabinet to allow for selective access to the oven compartment. The door includes a door frame defining a latch aperture, where the latch aperture includes a door engagement surface. A latching mechanism includes a door latch including an arm and a hook end extending from the arm, where the hook end defines a latch engagement surface configured to engage the door engagement surface. A coefficient of friction between the latch engagement surface and the door engagement surface when engaged is between about 0.7 and about 0.8. An actuator is configured to rotate the door latch between an unlocked position allowing for selective access of the oven compartment and a locked position preventing access to the oven compartment by engaging the latch engagement surface with the door engagement surface. The door latch is in the locked position when a cleaning cycle of said oven is active.

According to yet another aspect, an appliance includes an appliance cabinet defining a cavity, a door operably coupled to the appliance cabinet to allow for selective access to the cavity, the door including a door frame defining a latch aperture, and a latching mechanism operable between an unlocked position allowing for selective access to the cavity and a locked position to prevent selective access to the cavity. The latching mechanism includes a door latch having an arm and a hook end defining an engagement surface. The engagement surface is configured to engage the latch aperture of the door frame and extends at about an angle of between about 80° to about 90° away from the arm to engage the door frame.

These and other features, advantages, and objects of the present disclosure will be further understood and appreciated by those skilled in the art by reference to the following specification, claims, and appended drawings.

Figure 1:
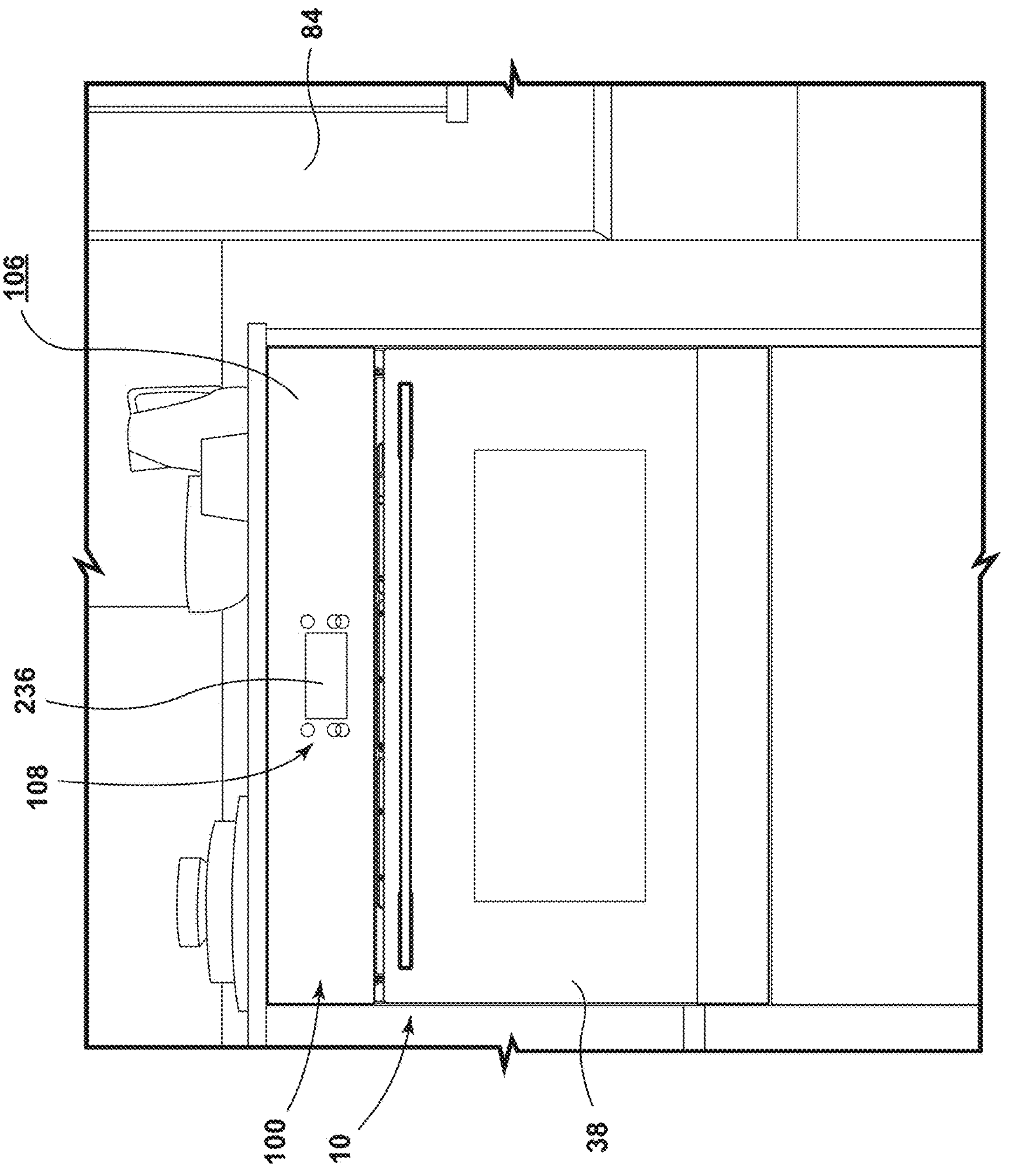
FIG. 1 is a front elevational view of a cooking appliance set within cabinetry within a kitchen, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an appliance door latch. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
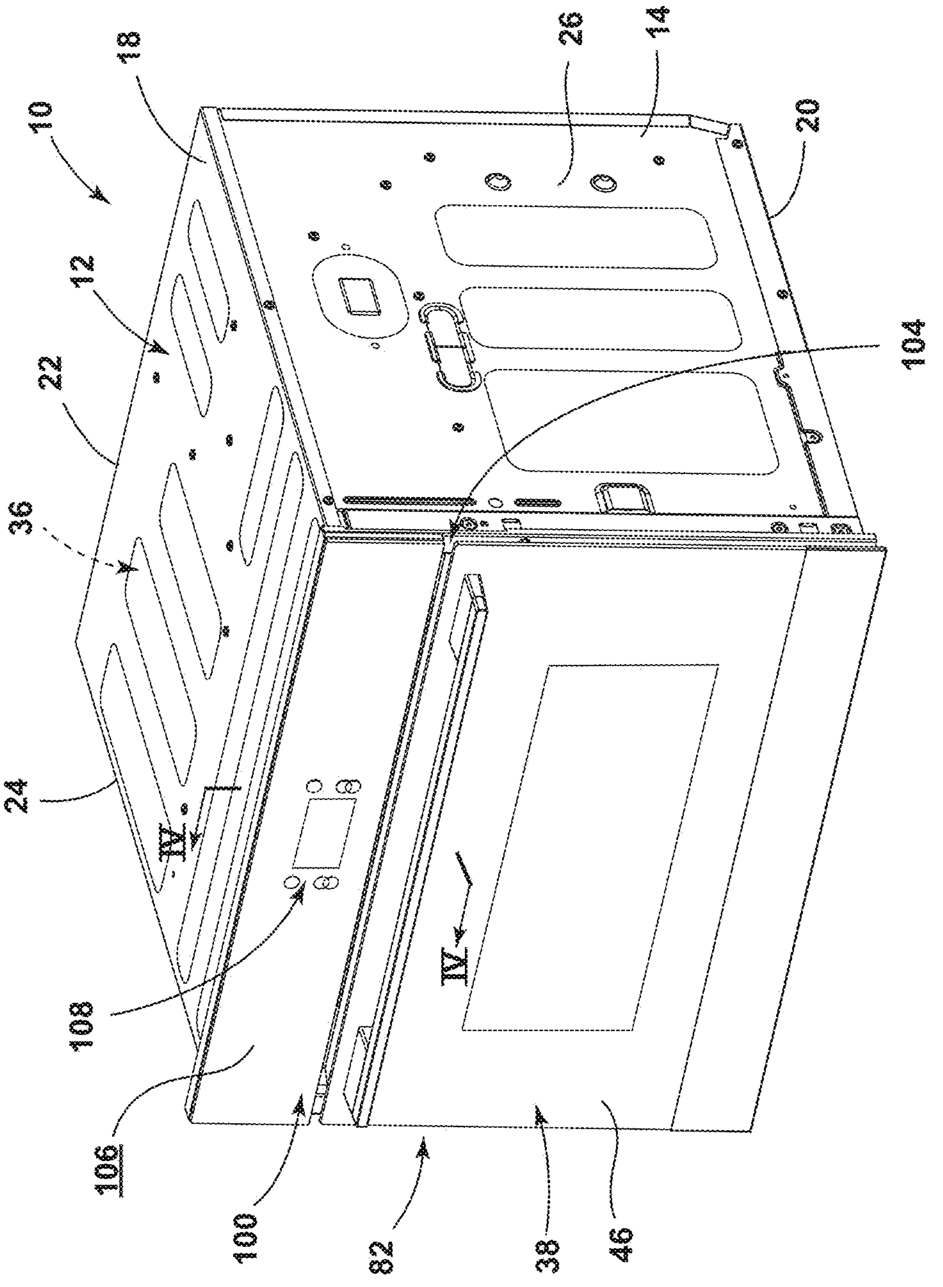
FIG. 2 is a front perspective view of a cooking appliance including a door in a closed position denying access to a cooking cavity from an external environment, according to the present disclosure.

For purposes of description herein, the terms "upper," "lower," "right," "left," "rear," "front," "vertical," "horizontal," and derivatives thereof shall relate to the disclosure as oriented in FIGS. 1 and 2. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-8, reference numeral 10 generally designates a cooking appliance including an appliance body 12 including a plurality of panels 14, which may include a front panel 16, a top panel 18, a bottom panel 20, a rear panel 22, a first side panel 24, and a second side panel 26. The front panel 16 defines a cavity aperture 28 and a lock aperture 30 or a latch aperture 30. A cooking cavity assembly 32 is disposed within the appliance body 12. The cooking cavity assembly 32 defines a cooking cavity 34 or an oven compartment 34. An electronics compartment 36 or electronics cavity 36 is defined between the top panel 18 of the appliance body 12 and the cooking cavity assembly 32. An appliance door 38 is operably coupled to the appliance body 12 to allow for selective access to the cooking cavity 34. The appliance door 38 includes a door frame 40 defining a latch aperture 42 or a latch receiving aperture 42 and a door engagement surface 44. An outer door panel 46 and an inner door panel 48 are coupled to the door frame 40.

A door lock assembly 50 or a latching mechanism 50 is disposed within the electronics compartment 36. The door lock assembly 50 includes a door latch 52 or a latch member 52. The latch member 52 includes an arm 54 and a hook end 56 extending from the arm 54. The hook end 56 defines a latch engagement surface 58 configured to engage the door engagement surface 44. An actuator 60 is configured to rotate the latch member 52 between an unlocked position 62 allowing for selective access of the cooking cavity 34 and a locked position 64 preventing access to the cooking cavity 34 by engaging the latch engagement surface 58 with the door engagement surface 44. The latch member 52 is in the locked position 64 when a cleaning cycle of said appliance is active.

Figure 3:
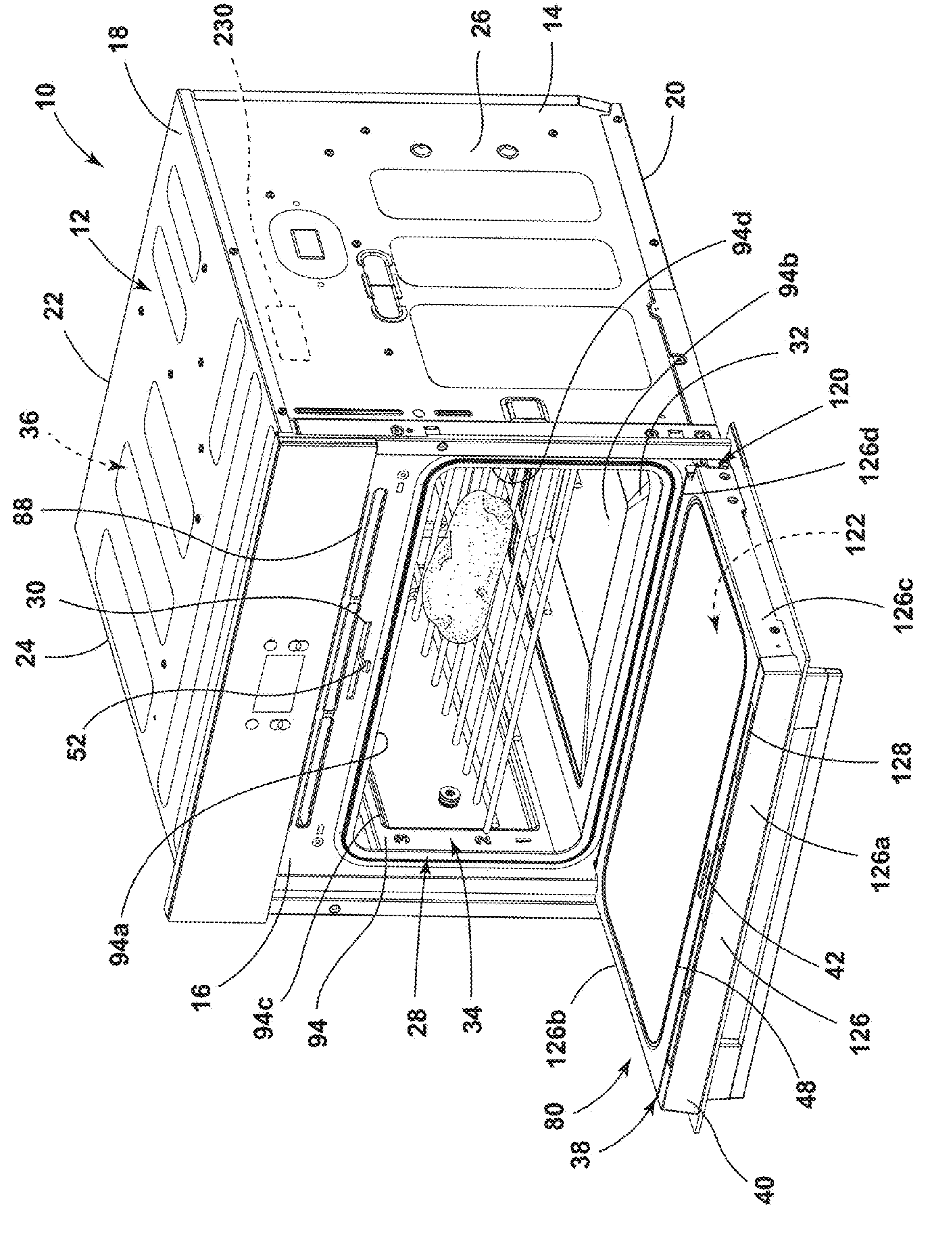
FIG. 3 is a front perspective view of a cooking appliance including a door in an open position allowing access to a cooking cavity, according to the present disclosure.

Referring to FIGS. 1-3, the cooking appliance 10 includes the appliance body 12 with the appliance door 38 rotatably coupled to the appliance body 12. The appliance door 38 is configured to rotate between an open position 80 and a closed position 82 to selectively allow access to the cooking cavity 34. The cooking appliance 10 is illustrated as a single-cavity, cabinet-mounted appliance. The cooking appliance 10 is coupled to cabinet 84 within a kitchen environment. It is contemplated that the cooking appliance 10 may be a mounted appliance, a slide-in appliance, a freestanding appliance, or a countertop appliance. Additionally, the cooking appliance 10 may include the single cooking cavity 34 or multiple cooking cavities 34. Additionally or alternatively, the cooking appliance 10 may be, for example, a microwave oven, a traditional oven, or a multi-function appliance that performs oven-like functions (e.g., roast, bake, etc.) as well as other functions.

The appliance body 12 may include the plurality of panels 14 defining an internal volume 86. The plurality of panels 14 may include the front panel 16, the top panel 18, the bottom panel 20, the rear panel 22, the first side panel 24, and the second side panel 26. Each of the panels 14 may be coupled to adjacent panels 14 to define the appliance body 12. The front panel 16 of the appliance body 12 may define the cavity aperture 28, the latch aperture 30, and may define vent apertures 88. The vent apertures 88 may be in fluid communication with the electronics compartment, environment surrounding the cooking appliance 10, and the door 38.

Figure 4:
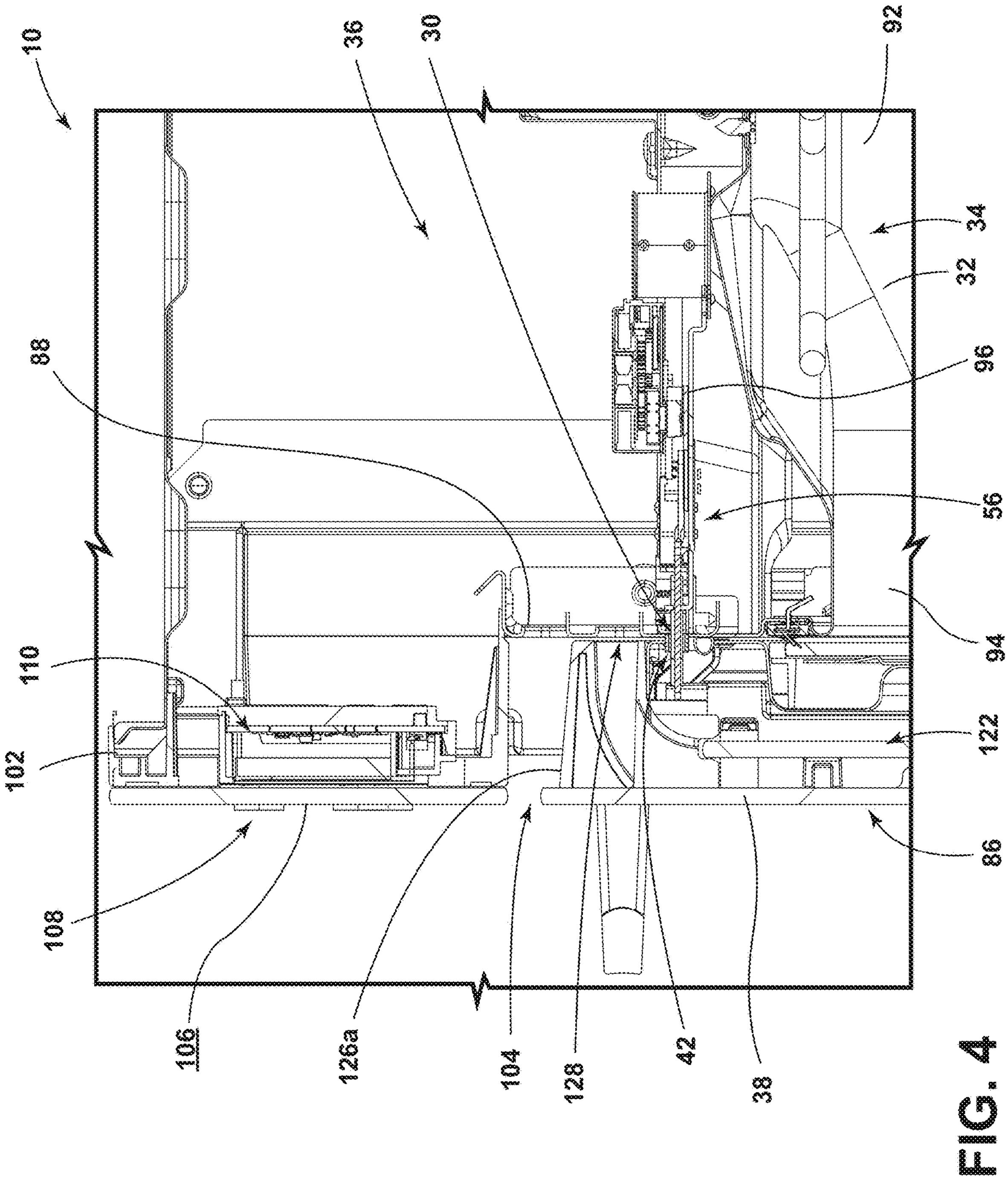
FIG. 4 is a cross-section of the cooking appliance of FIG. 2, taken along line IV-IV, the cooking appliance includes a door lock assembly, according to the present disclosure.

Referring still to FIGS. 1-3, and now also FIG. 4, the cavity assembly 32 is disposed within the internal volume 86 of the appliance body 12 and defines the cooking cavity 34. The cavity assembly 32 may be coupled to the front panel 16 of the appliance body 12 to align the cooking cavity 34 with the cavity aperture 28 of the front panel 16. The appliance body 12 and the cavity assembly 32 form an appliance cabinet or an oven cabinet that defines the cooking cavity 34. The electronics compartment 36 is defined between the cavity assembly 32 and the appliance body 12. The electronics compartment 36 is generally defined above the cavity assembly 32 and below the top panel 18 of the appliance body 12. However, it is contemplated that the electronics compartment 36 between the appliance body 12 and either side, below, behind, and/or above the cavity assembly 32.

In some implementations, the cavity assembly 32 may be a cavity liner 92 having a plurality of panels 94, which may include an upper panel 94*a*, a lower panel 94*b*, a first side panel 94*c*, a second side panel 94*d* and a rear panel 94. In such implementations, the cavity liner 92 separates the cooking cavity 34 from the electronics compartment 36. In other implementations, the cavity assembly 32 may include the cavity liner 92 and a divider panel 96 or a divider wall 96 coupled to the cavity liner 92. In such implementations, the electronics compartment 36 may be partially or fully defined between the divider wall 96 and the appliance body 12. When the electronics compartment 36 is partially defined between the divider wall 96 and the appliance body 12, the cavity liner 92 may further define the electronics compartment 36.

A control panel assembly 100 may be positioned above the front panel 16 and includes a housing 102. The housing 102 extends forward of the front panel 16 and forms a forward upper edge of the appliance body 12 that extends over a top edge 104 of the appliance door 38 when the appliance door 38 is in the closed position 82. The housing

102 of the control panel assembly 100 may be operably coupled with the appliance body 12 or may be integrally formed with the appliance body 12. A front surface 106 of the housing 102 is oriented to be substantially co-planar with a front surface of the appliance door 38 when the appliance door 38 is in the closed position 82. The control panel assembly 100 further includes a plurality of user inputs 108 positioned on the front surface 106 of the housing 102. The user inputs 108 may include knobs, a touch display, or any other user input capable of providing instructions regarding the operation of the appliance 10 without departing from the teaching of the present disclosure.

The housing 102 of the control panel assembly 100 may define a control panel cavity 110 configured to house various electronic components of the cooking appliance 10 (e.g., electrical connections for the user inputs 108). The control panel cavity 110 may be in communication with the electronics compartment 36 of the appliance body 12 or may be defined separately from the electronics compartment 36.

Referring still to FIGS. 1-4, the door 38 is operably coupled to appliance body 12 to allow for selective access to the cooking cavity 34. The door 38 may be coupled to the front panel 16 of the appliance body 12 using hinges 120. The door 38 may include the door frame 40 extending around a perimeter of the door 38 and the outer door panel 46 and the inner door panel 48 coupled to the door frame 40 to define an interior space 122.

In some implementations, the door frame 40 may include a plurality of frame members 126, which may include a top frame member 126*a*, a first side frame member 126*b*, a second side frame member 126*c* and a bottom frame member 126*d*, coupled together to form the door frame 40. The top frame member 126*a* may extend across the door 38 proximate the top edge 104 of the door 38. The top frame member 126*a* may be configured to couple the outer door panel 46 and the inner door panel 48 together, with other frame members 126, to form the door 38. For example, the top frame member 126*a* may be shaped as a rectangular cap configured to fit over top edges of one or both of the outer and inner door panels 46, 48.

The top frame member 126*a* may define door vents 128 configured to be aligned with some or all of the vent apertures 88 of the front panel 16 when the door 38 is in the closed position 82. The vents 128 may be configured to place the interior space 122 of the door 38 in fluid communication with the electronics compartment 36 and may direct air through the door 38 and the electronics compartment 36.

The top frame member 126*a* may define the latch receiving aperture 42 proximate the top edge 104 of the door 38. The latch receiving aperture 42 may have a similar size and shape to the size and shape of the latch aperture 30 or may have a different size and shape compared to the latch aperture 30. When the door 38 is in the closed position 82, the latch receiving aperture 42 is configured to align with the latch aperture 30, to allow for the door lock assembly 50 to be moved between the unlocked position 62 and the locked position 64, as discussed herein.

In other implementations, the door frame 40 may be single, continuous piece and define the latch receiving aperture 42 and the door vents 128. The latch receiving aperture 42 and the door vents 128 may be defined proximate the top edge 104 of the door 38, similar to that discussed with reference to the top frame member 126*a*.

The latch receiving aperture 42 includes the door engagement surface 44 to engage the latch member 52. The latch receiving aperture 42 may include a lip or a protrusion 130 extending around a perimeter of the latch receiving aperture 42. The protrusion 130 may define the door engagement surface 44 on a distal end of the protrusion 130.

Figure 5A:
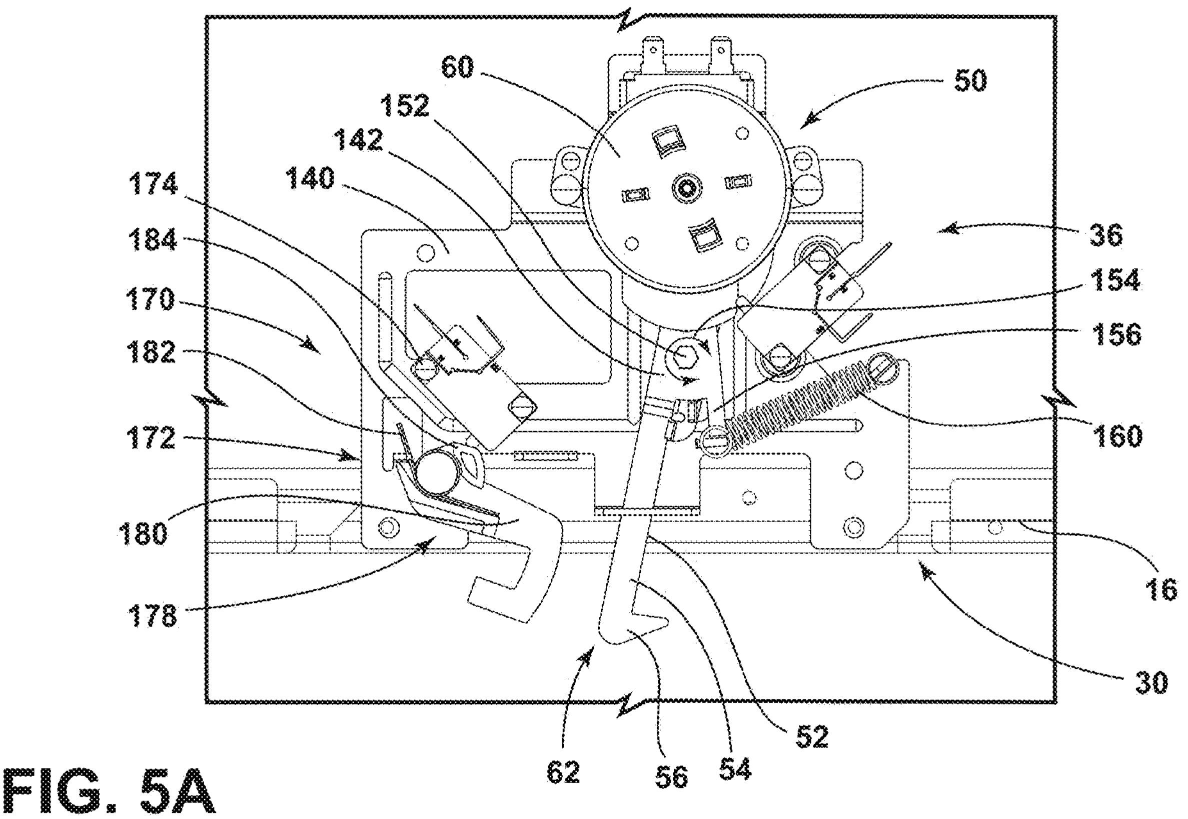
FIG. 5A is a partial top elevational view of a door lock assembly disposed in an electronics compartment of a cooking appliance, the door lock assembly is in an unlocked position and a door position sensor in a disengage position, according to the present disclosure.
Figure 5B:
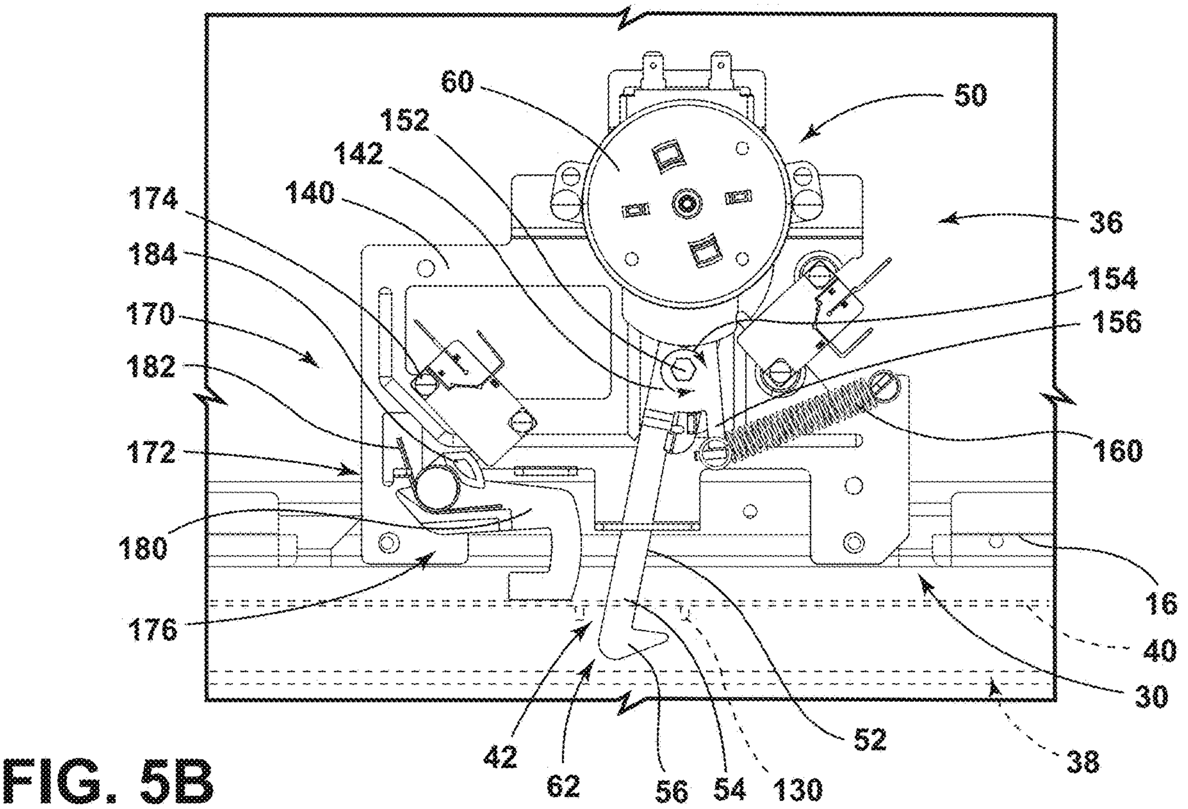
FIG. 5B is a partial top elevational view of a door lock assembly disposed in an electronics compartment of a cooking appliance, the door lock assembly is in an unlocked position and a door position sensor in an engage position, according to the present disclosure.
Figure 5C:
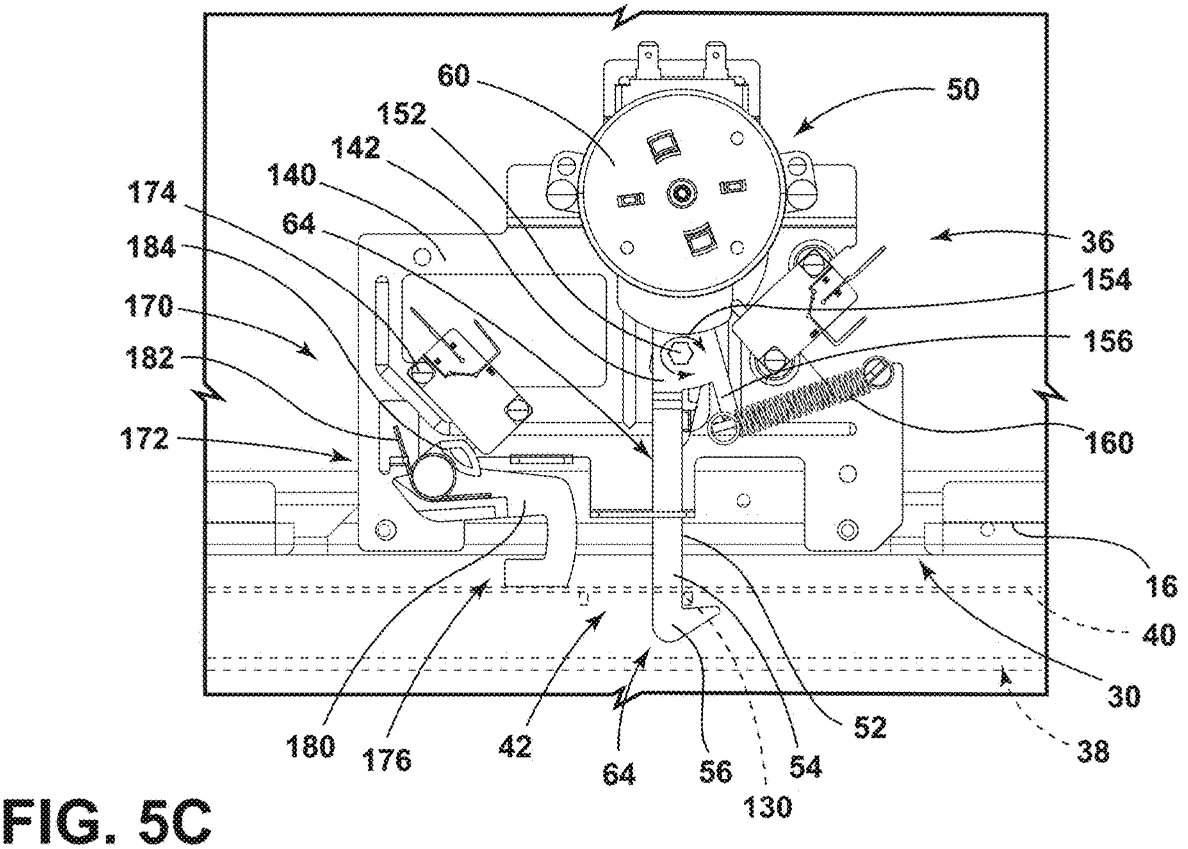
FIG. 5C is a partial top elevational view of a door lock assembly disposed in an electronics compartment of a cooking appliance, the door lock assembly is in a locked position and a door position sensor in an engage position, according to the present disclosure.
Figure 6:
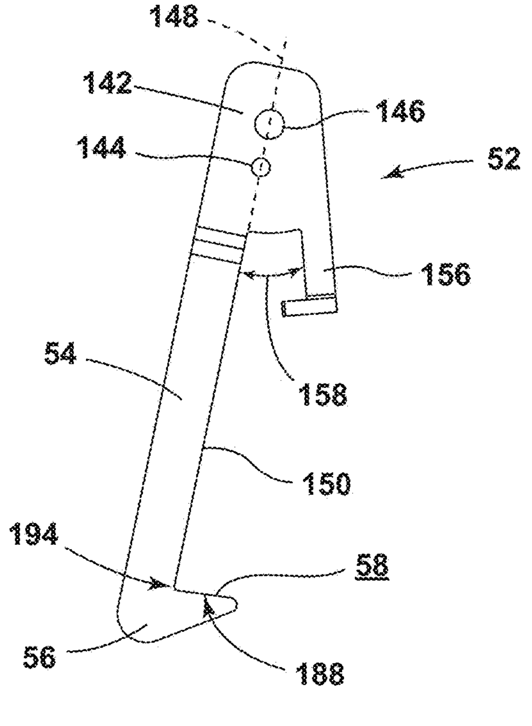
FIG. 6 is a top elevational view of a latch member, according to the present disclosure.

Referring to FIGS. 5A-6, the door lock assembly 50 is positioned within the electronics compartment 36 and positioned rearward of the front panel 16. The door lock assembly 50 is aligned with the latch aperture 30 defined in the front panel 16, allowing for the latch member 52 to extend therethrough. In various implementations, the door lock assembly 50 may be supported by the divider panel 96 of the cavity assembly 32. In other examples, the door lock assembly 50 may be supported by the cavity liner 92 or other surface positioned to orient the door lock assembly 50 to align with the latch aperture 30 of the front panel 16.

The door lock assembly 50 is generally configured to have the unlocked position 62 (illustrated in FIGS. 5A and 5B) and the locked position 64 (illustrated in FIG. 5C). When the door lock assembly 50 is in the unlocked position 62, the door 38 is operable between the open position 80 and the closed position 82, which allows for selective access to the cooking cavity 34. When the door lock assembly 50 is in the locked position 64 and engaging the door 38, the door 38 is prevented from being moved from the closed position 82 to the open position 80 due to the latch member 52 engaging the door frame 40. The door lock assembly 50 may be used to prevent access to the cooking cavity 34 when the cooking appliance 10 is in operation or not in operation.

The door lock assembly 50 includes the latch member 52 positioned proximate to and aligned with the latch aperture 30 and operably coupled with a base plate 140. The latch member 52 includes a base portion 142 operably coupled with the base plate 140. The latch member 52 includes the arm 54 extending from the base portion 142 and through the latch aperture 30. The latch member 52 may also include the hook end 56 extending from the arm 54. The hook end 56 defines the latch engagement surface 58 that engages the door engagement surface 44 when the door latching mechanism 50 is in the looked position 64.

The base portion 142 of the latch member 52 may define a first aperture 144 and a second aperture 146. The first aperture 144 and the second aperture 146 may be aligned on a line 148 extending along an inner edge 150 of the arm 54. A fastener 152 may extend through the first aperture 144 and through an aperture defined on the base plate 140 to form a pivot point, as shown by arrow 154. The pivot point 154 allows for the latch member 52 to be rotated between the unlocked position 62 and the locked position 64. The fastener 152 may be a bolt, screw, rivet, or any other fastener allowing for the latch member 52 to rotate.

The latch member 52 may include a hook arm 156 or a biasing arm 156 extending at an angle 158 relative to the inner edge 150 of the arm 54. The hook arm 156 may be coupled to a biasing member 160 coupled to the base plate 140. The biasing member 160 biases the latch member 52 toward the locked position 64. The biasing member 160 has a biasing force that must be overcome by the actuator 60 to move the latch member 52 to the unlocked position 62. Similarly, the biasing member 160 may retain or assist in retaining the latch member 52 in the locked position 64.

The actuator 60 may be coupled to the base plate 140 and configured to rotate the latch member 52 around the pivot point 154 between the unlocked position 62 and the locked position 64. The actuator 60 may be coupled to the latch member 52 via the second aperture 146 to rotate the latch member 52. The actuator 60 overcomes the biasing force of the biasing member 160 to move the latch member 52 from the locked position 64 to the unlocked position 62. The actuator 60 may retain the latch member 52 in the locked position 64.

The latch member 52 is not limited to being rotatably coupled to base plate 140 and may have other configurations. For example, the latch member 52 may have a pivot point that slides relative to the latch aperture 30 and the base plate 140, and rotates to engage the door engagement surface 44.

Referring to FIGS. 5A-5C, the door lock assembly 50 may also include a door position sensor 170 or a door close sensor 170 configured to determine whether the door 38 was in the open position 80 or in the closed position 82. The door position sensor 170 may be an optical sensor, a light sensor, a switch sensor, or other sensor configured to determine the position of the door 38. The door position sensor 170 may also be a mechanical mechanism to trigger a sensor.

As illustrated in FIGS. 5A-5C, the door position sensor 170 is a mechanical mechanism 172 configured to trigger or activate a switch sensor 174. The mechanical mechanism 172 has an engaged position 176 (illustrated in FIGS. 5B and 5C) where the mechanism 172 is engaged with the door 38 and a disengaged position 178 (illustrated in FIG. 5A), where the mechanism 172 is not engaged with the door 38. The mechanical mechanism 172 includes an arm 180 having a c-shape and a biasing member 182. The arm 180 is pivotable coupled to the base plate 140 allowing for the arm 180 to be rotated between the engaged position 176 and the disengaged position 178. The biasing member 182 biases the arm 180 toward the disengaged position 178. The biasing of the arm 180 allows for the arm 180 to move to the disengaged position 178 when the door 38 is not in the closed position 82.

The arm 180 includes a bulge 184 configured to activate or depress the switch sensor 174 when the arm is 180 is in the engaged position 176 and not activate the switch sensor 174 when in the disengaged position 178. As illustrated in FIG. 5A, when the door 38 is in the open position 80 or spaced away from the arm 180, the switch sensor 174 is not activated due to the arm 180 being in the disengaged position 178 and the bulge 184 not contacting the switch sensor 174. As illustrated in FIGS. 5B and 5C, when the door 38 is in the closed position 82, the bulge 184 of the arm 180 engages the switch sensor 174 indicating that the door 38 is in the closed position 82. The biasing force toward the disengaged position 178 of the biasing member 182 is overcome when the door 38 is in the closed position 82, allowing for the switch sensor 174 to be activated. The door position sensor 170 may be used in the operation of the appliance, as discussed further herein.

Figure 7A:
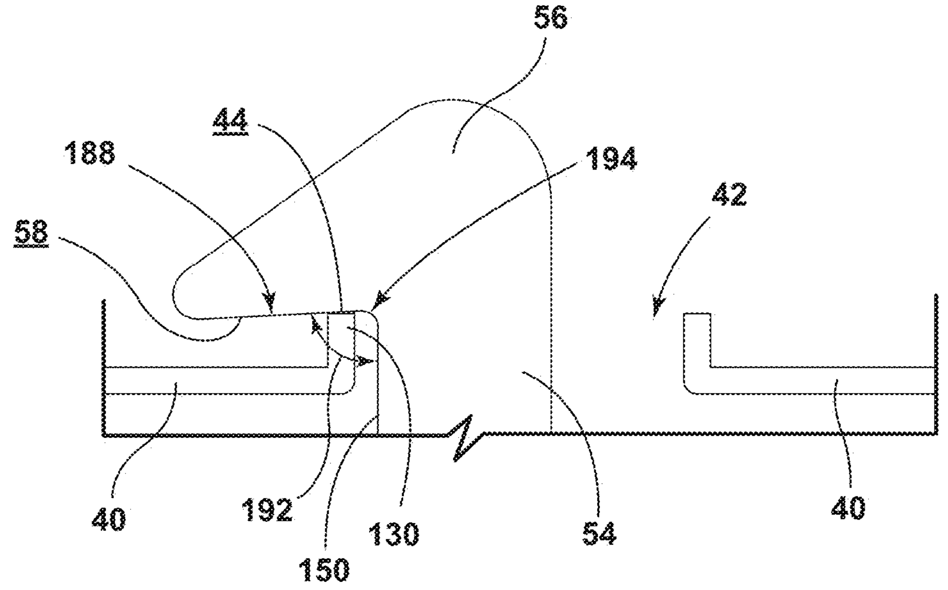
FIG. 7A is a partial top elevational view of a latch member including a latch engagement surface engaging a latch receiving aperture, the latch engagement surface extending at an angle away from an arm of the latch member, according to the present disclosure.
Figure 7B:
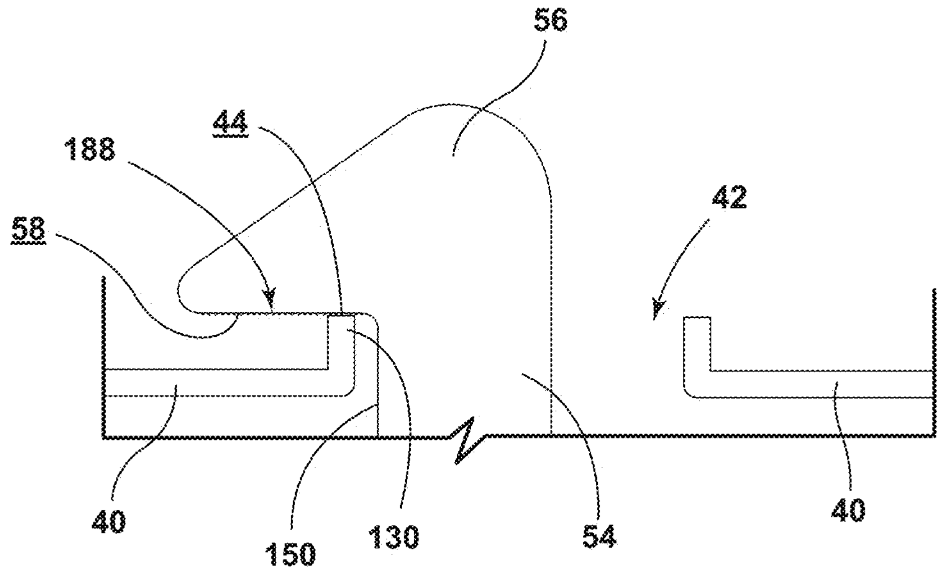
FIG. 7B is a partial top elevational view of a latch member including a latch engagement surface engaging a latch receiving aperture, the latch engagement surface being textured, according to the present disclosure.
Figure 7C:
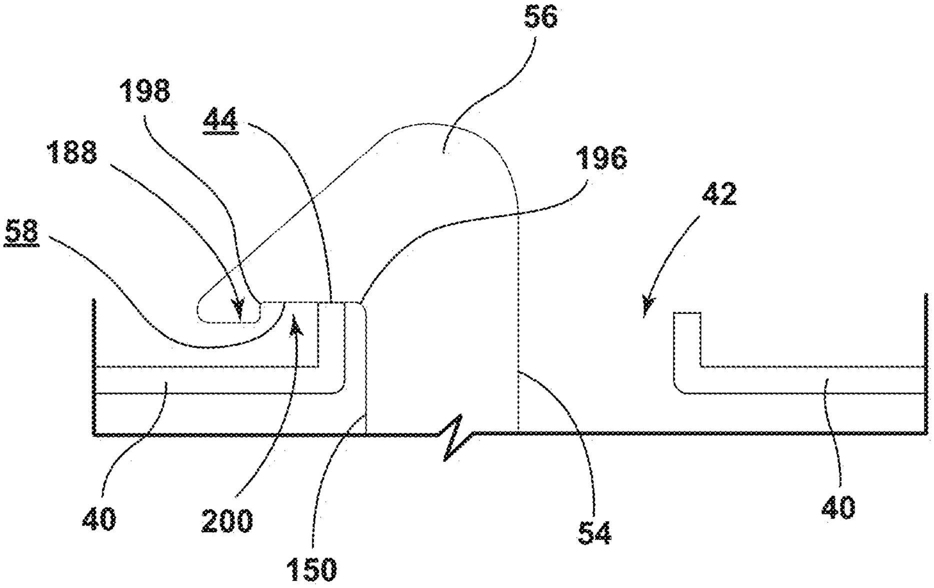
FIG. 7C is a partial top elevational view of a latch member including a latch engagement surface engaging a latch receiving aperture, the latch engagement surface being recessed relative to a bottom edge of a hook end, according to the present disclosure.
Figure 7D:
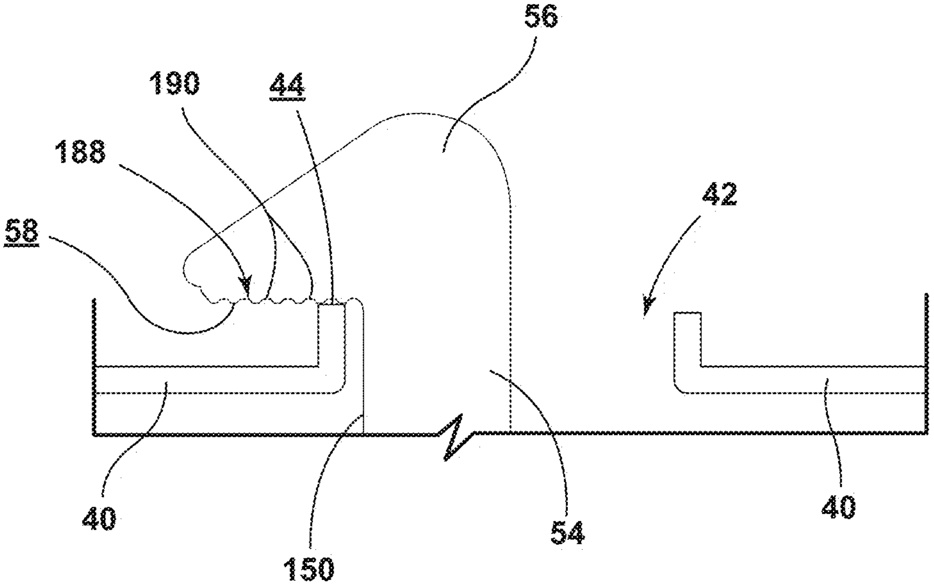
FIG. 7D is a partial top elevational view of a latch member including a latch engagement surface engaging a latch receiving aperture, the latch engagement surface including a plurality of recesses, according to the present disclosure.

Referring to FIGS. 6-7D, the latch engagement surface 58 is configured to retain the door in the closed position 82 when the door latching mechanism 50 is in the locked position 64. When the latch member 52 is in the locked position 64, the door 38 is held shut. To reduce or prevent the latch member 52 from slipping off or disengaging from the door engagement surface 44 when in the locked position 64, the latch engagement surface 58 may extend away at an angle 192 (as illustrated in FIG. 7A) and/or be textured (as illustrated in FIG. 7B) to increase a coefficient of friction between the latch engagement surface 58 and the door engagement surface 44. The latch engagement surface 58 may be recessed relative to a bottom edge 188 of the hook end 56 (as illustrated in FIG. 7C) and/or include a plurality of recesses 190 relative to the bottom edge 188 of the hook end 56 (as illustrated in FIG. 7D) to reduce or prevent the latch member 52 from slipping off or disengaging from the door engagement surface 44 when in the locked position 64.

The latch engagement surface 58 may extend away from the arm 54 at an angle 192 (as illustrated in FIG. 7A), perpendicular from the arm 54 (as illustrated in FIG. 7B), or substantially perpendicular from the arm 54. Stated differently, the bottom edge 188 of the hook end 56 may extend away from the arm 54 at the angle 192, perpendicular from the arm 54, or substantially perpendicular from the arm 54. The latch engagement surface 58 being angled relative to the arm 54 forms a point 194 where the door engagement surface 44 is seated. Seating the door engagement surface 44 within the point 194 reduces or prevents the latch member 52 from slipping off or disengaging from the door engagement surface 44, when in the locked position 64. The door engagement surface 44 being seated at the point 194 increases the force required to disengage the door latch 52 from the door engagement surface 44, when in the locked position 64.

The angle 192 the latch engagement surface 58 extends away from the arm 54 may be an acute angle. In some implementations, the angle 192 the latch engagement surface 58 extends away from the arm 54 may be between about 80° and about 89°, between about 83° and about 88°, or between about 85° and 87°. In other implementations, the angle 192 may be about 78°, about 79°, about 80°, about 81°, about 82°, about 83°, about 84°, about 85°, about 86°, about 87°, about 88°, about 89°, or within any range bound by any two of those values (e.g., from about 78° to about 89°, from about 82° to about 84°, from about 86° to about 88°, etc.).

The latch engagement surface 58 may be textured to engage the door engagement surface 44 to increase the coefficient of friction between the latch engagement surface 58 and the door engagement surface 44. The latch engagement surface 58 may be a textured metal surface or a bare metal surface to engage the door engagement surface 44. Similarly, the door engagement surface 44 may be a textured metal surface or a bare metal surface to engage the latch engagement surface 58. The increased coefficient of friction between the latch engagement surface 58 and the door engagement surface 44, consequently, increases the force required to disengage the door latch 52 from the door engagement surface 44, when in the locked position 64.

The coefficient of friction between the latch engagement surface 58 and the door engagement surface 44 may be between about 0.70 and about 0.80, between about 0.68 and about 0.82, or between about 0.74 and about 0.76. In other implementations, the coefficient of friction between the latch engagement surface 58 and the door engagement surface 44 may be about 0.67, about 0.68, about 0.69, about 0.70, about 0.71, about 0.72, about 0.73, about 0.74, about 0.75, about 0.76, about 0.77, about 0.78, about 0.79, about 0.80, about 0.81, about 0.82, about 0.83 or within any range bound by any two of those values (e.g., from about 0.67 to about 0.83, from about 0.70 to about 0.75, from about 0.74 to about 0.79, etc.).

Referring to FIG. 7C, the latch engagement surface 58 may extend along a recessed surface 196. The recessed surface 196 may extend between the inner edge 150 of the arm 54 and a recess wall 198 and parallel to the bottom edge 188 of the hook end 56. The recess wall 198 may extend between the recessed surface 196 and the bottom edge 188 of the hook end 56 and extend perpendicular to the recess surface 196. The recess wall 198, the latch engagement surface 58, and the inner edge 150 of the arm 54 form a recessed portion 200 that engages the door engagement surface 44. The door engagement surface 44 engages the latch engagement surface 58 and the recces wall 198, which may reduce or prevent the latch member 52 from slipping off or disengaging from the door engagement surface 44, when in the locked position 64.

Referring to FIG. 7D, the latch engagement surface 58 may include the plurality of recesses 190 to engage the door engagement surface 44. The plurality of recesses 190 may be U-Shaped recesses, V-Shaped recesses, or other geometric shaped recesses. One or more of the recesses 190 may engage the door engagement surface 44. An edge of the door engagement surface 44 may be seated in one or more of the recesses 190. The door engagement surface 44 engaging with the recesses 190 may reduce or prevent the latch member 52 from slipping off or disengaging from the door engagement surface 44, when in the locked position 64.

Figure 8:
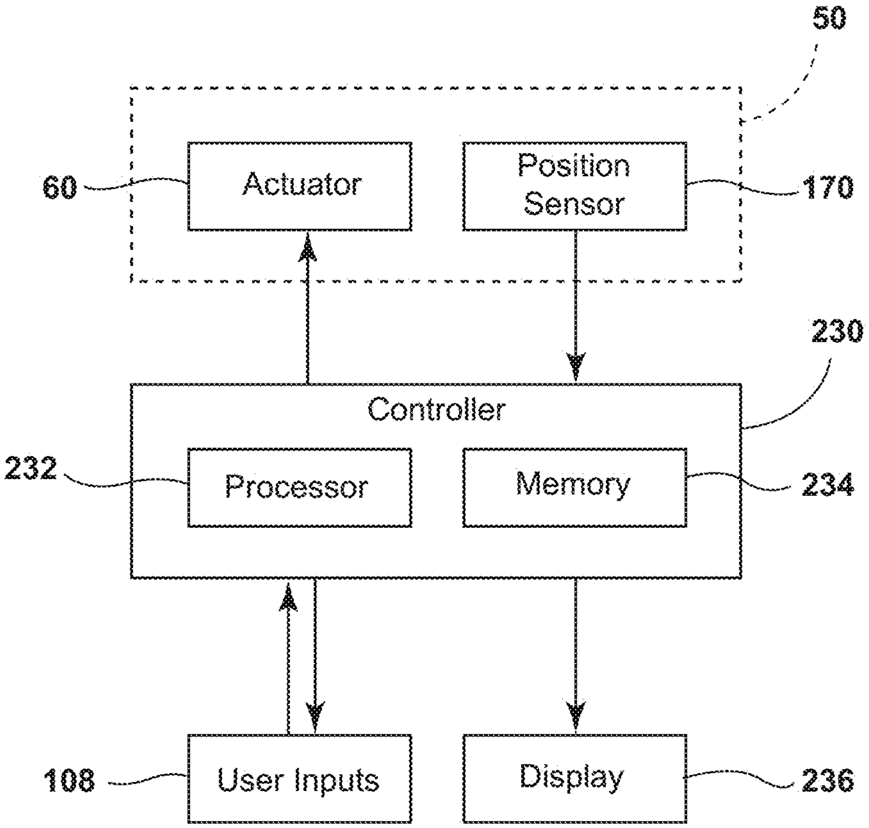
FIG. 8 is a schematic diagram of a control system for a cooking appliance, according to the present disclosure.

Referring to FIG. 8, with reference to FIGS. 1-7D, various components of the cooking appliance 10 are schematically illustrated, including the door lock assembly 50. The cooking appliance 10 includes a controller 230 including a processor 232 and memory 234 configured to store instructions. The controller 230 is in communication with and configured to receive input from the user inputs 108 of the control panel assembly 100 and from various sensors of the appliance 10, including the door position sensor 170. The controller 230 is configured to utilize the inputs to provide instructions to various other components of the cooking appliance 10, such as, for example, heating elements configured to heat the cooking cavity 34. Where the user inputs 108 includes a display 236, the controller 230 may further be configured to communicate with the display 236 to show information regarding the cooking appliance 10 (e.g., the position of the door 38 and/or door lock assembly 50).

The door position sensor 170 is configured to detect the position of the door 38 and is configured to provide input to the controller 230 regarding the position of the door 38 (e.g., whether the door 38 is in the open position 80 or in the closed position 82). Specifically, when a user selects a high-heat cycle (e.g., a cleaning cycle) for the cooking appliance 10 using the user inputs 108, the controller 230 is configured to utilize an input from the door position sensor 170 to determine the position of the door 38 prior to initiating the high-heat cycle. If the door 38 is in the closed position 82, the controller 230 is configured to actuate the actuator 60 of the door lock assembly 50 to move the latch member 52 of between the unlocked position 62 and the locked position 64 based on the inputs from the user inputs 108. In other examples, the controller 230 may receive input from a high-heat cycle specific input positioned proximate the other user inputs 108 of the control panel assembly 64 and may be configured to operate the actuator 60 based on input from the high-heat cycle specific input.

When the latch member 52 is in the locked position 64, and the door 38 is secured in the closed position 82, the controller 230 is configured to operate the cooking appliance 10 to initiate the high-heat cycle. However, if the door position sensor 170 senses that the door 38 is not in the closed position 82 (e.g., is in an intermediate position or in the open position 80), the controller 230 is configured to prevent initiation of the high-heat cycle based on the input from the door position sensor 170. It is contemplated that the controller 230 may be configured to prevent or limit any operation of the cooking appliance 10, including initiation of various heat cycles or activation of the actuator 60 to move the latch member 52 to the locked position 64, when the door 38 is in the open position 80 without departing from the teaching of the present disclosure.

Use of the present device may provide a variety of advantages. For example, the door lock assembly 50 may provide a secure coupling of the door 38 with the appliance body 12 when the door 38 is in the closed position 82 and the latch member 52 of the locked position 64. Further, the latch engagement surface 58 extending at the angle 192 away from the arm 54 and/or being textured to increase the coefficient of friction between the latch engagement surface 58 and the door engagement surface 44 may provide for a more secure coupling of the door 38 to appliance body 12. This more secure coupling may be achieved by reducing or preventing the latch member 52 from slipping or disengaging from the door engagement surface 44 of the latch receiving aperture 42 due to the angle 192 and/or the increased coefficient of friction between the latch engagement surface 58 and the door engagement surface 44. Furthermore, the door position sensor 170 may provide input to the controller 230 to ensure the door 38 is in the closed position 82 before the door lock assembly 50 is actuated and the latch member 52 is moved into the locked position 64 to couple the door 38 with the appliance body 12 and before the controller 230 activates the high-heat cycle of the cooking appliance 10. Additional benefits or advantages may be realized and/or achieved.

The disclosure herein is further summarized in the following paragraphs and is further characterized by combinations of any and all of the various aspects described therein.

According to one aspect of the present disclosure, a cooking appliance includes an appliance body including a plurality of panels. The plurality of panels includes a front panel and a top panel, where the front panel defines a cavity aperture and a lock aperture. A cooking cavity assembly is disposed within the appliance body, where the cooking cavity assembly defines a cooking cavity, and where an electronics cavity is defined between the top panel of the appliance body and the cooking cavity assembly. An appliance door is operably coupled to the appliance body to allow for selective access to the cooking cavity and includes a door frame defining a latch aperture and a door engagement surface and inner and outer door panels coupled to the door frame. A door lock assembly is disposed within the electronics cavity and includes a door latch including an arm and a hook end extending from the arm. The hook end defines a latch engagement surface and is configured to engage the door engagement surface. The latch engagement surface extends at about an angle of between about 80° to about 90° away from the arm to engage the door frame. An actuator is configured to rotate the door latch between an unlocked position allowing for selective access of the cooking cavity and a locked position preventing access to the cooking cavity by engaging the latch engagement surface with the door engagement surface. The door latch is in the locked position when a cleaning cycle of said appliance is active.

According to another aspect, a door lock assembly includes a door close sensor configured to sense whether a door is in a closed position.

According to yet another aspect, when a door close sensor senses a door is in an open position an actuator does not rotate a door latch to a locked position.

According to another aspect, a door close sensor includes a switch sensor and an arm having an engaged position and a disengaged position. The arm activates the switch sensor in the engaged position, and the switch sensor is not activated when the arm is in the disengaged position. The arm is in the engaged position when a door is in a closed position. A biasing member configured to bias the arm toward the disengaged position. The arm is in the disengaged position when the door is in an open position or an intermediate position.

According to yet another aspect, a latch engagement surface extends at about an angle of about 86° away from an arm to engage a door frame.

According to another aspect, a coefficient of friction between a latch engagement surface and a door engagement surface when engaged is between about 0.7 and about 0.8.

According to yet another aspect, a latch engagement surface is a first textured metal surface and a door engagement surface is a second textured metal surface. The engagement of the first textured metal surface and the second textured metal surface forms a coefficient of friction between the latch engagement surface and the door engagement surface.

According to another aspect, a coefficient of friction between a latch engagement surface and a door engagement surface when engaged is about 0.75.

According to another aspect, an oven includes an oven cabinet defining an oven compartment. A door is operably coupled to the oven cabinet to allow for selective access to the oven compartment. The door includes a door frame defining a latch aperture, where the latch aperture includes a door engagement surface. a latching mechanism includes a door latch including an arm and a hook end extending from the arm, where the hook end defines a latch engagement surface configured to engage the door engagement surface. A coefficient of friction between the latch engagement surface and the door engagement surface when engaged is between about 0.7 and about 0.8. An actuator is configured to rotate the door latch between an unlocked position allowing for selective access of the oven compartment and a locked position preventing access to the oven compartment by engaging the latch engagement surface with the door engagement surface. The door latch is in the locked position when a cleaning cycle of said oven is active.

According to yet another aspect, a latch engagement surface extends at about an angle of between about 80° to about 90° away from an arm to engage a door frame.

According to another aspect, a latch engagement surface extends at about an angle of about 86° away from an arm to engage a door frame.

According to yet another aspect, a coefficient of friction between the latch engagement surface and a door engagement surface when engaged is about 0.75.

According to another aspect, a latching mechanism includes a door close sensor configured to sense whether the door is in a closed position. When a door close sensor senses the door is not in the closed position, the actuator does not rotate the door latch to the locked position.

According to yet another aspect, a latch engagement surface is a first textured metal surface and the door engagement surface is a second textured metal surface. The engagement of the first textured metal surface and the second textured metal surface forms a coefficient of friction between the latch engagement surface and the door engagement surface.

According to yet another aspect, an appliance includes an appliance cabinet defining a cavity, a door operably coupled to the appliance cabinet to allow for selective access to the cavity, the door including a door frame defining a latch aperture, and a latching mechanism operable between an unlocked position allowing for selective access to the cavity and a locked position to prevent selective access to the cavity. The latching mechanism includes a door latch having an arm and a hook end defining an engagement surface. The engagement surface is configured to engage the latch aperture of the door frame and extends at about an angle of between about 80° to about 90° away from the arm to engage the door frame.

According to another aspect, an engagement surface extends at about an angle of about 86° away from an arm to engage a door frame.

According to yet another aspect, a latch aperture defines a door engagement surface, where a coefficient of friction between an engagement surface and the door engagement surface when engaged is between about 0.7 and about 0.8.

According to another aspect, a latching mechanism is in a locked position when a cleaning cycle of an appliance is active.

According to yet another aspect, a latching mechanism includes an actuator configured to move a door latch between an unlocked position and a locked position.

According to another aspect, a latching mechanism includes a door close sensor configured to sense whether a door is in a closed position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:

an appliance body including a plurality of panels, wherein the plurality of panels includes a front panel and a top panel, and wherein the front panel defines a cavity aperture and a lock aperture;

a cooking cavity assembly disposed within the appliance body, wherein the cooking cavity assembly defines a cooking cavity, wherein an electronics cavity is defined between the top panel of the appliance body and the cooking cavity assembly;

an appliance door operably coupled to the appliance body to allow for selective access to the cooking cavity, wherein the appliance door includes:

a door frame defining a latch aperture and a door engagement surface;

an outer door panel coupled to the door frame; and an inner door panel coupled to the door frame; and a door lock assembly disposed within the electronics cavity, the door lock assembly includes:

a door latch including an arm and a hook end extending from the arm, wherein the hook end defines a latch engagement surface configured to engage the door engagement surface, and wherein the latch engagement surface extends at about an angle of between about 80° to about 90° away from the arm to engage the door frame, wherein a coefficient of friction between the latch engagement surface and the door engagement surface when engaged is between about 0.7 and about 0.8, wherein the latch engagement surface is a first textured metal surface and the door engagement surface is a second textured metal surface, and wherein the engagement of the first textured metal surface and the second textured metal surface forms the coefficient of friction between the latch engagement surface and the door engagement surface; and an actuator configured to rotate the door latch between an unlocked position allowing for selective access of the cooking cavity and a locked position preventing access to the cooking cavity by engaging the latch engagement surface with the door engagement surface, wherein the door latch is in the locked position when a cleaning cycle of said appliance is active.

2. The cooking appliance of claim 1, wherein the door lock assembly includes a door close sensor configured to sense whether the door is in a closed position.

3. The cooking appliance of claim 2, wherein when the door close sensor senses the door is in an open position the actuator does not rotate the door latch to the locked position.

4. The cooking appliance of claim 2, wherein the door close sensor includes:

a switch sensor;

an arm having an engaged position and a disengaged position, wherein the arm activates the switch sensor in the engaged position, and wherein the switch sensor is not activated when the arm is in the disengaged position, and further wherein the arm is in the engaged position when the door is in a closed position; and a biasing member configured to bias the arm toward the disengaged position, wherein the arm is in the disengaged position when the door is in an open position or an intermediate position.

5. The cooking appliance of claim 1, wherein the latch engagement surface extends at about an angle of about 86° away from the arm to engage the door frame.

6. The cooking appliance of claim 1, wherein a coefficient of friction between the latch engagement surface and the door engagement surface when engaged is about 0.75.

7. An oven, comprising:

an oven cabinet defining an oven compartment;

a door operably coupled to the oven cabinet to allow for selective access to the oven compartment, the door including a door frame defining a latch aperture, wherein the latch aperture includes a door engagement surface; and a latching mechanism including:

a door latch including an arm and a hook end extending from the arm, wherein the hook end defines a latch engagement surface configured to engage the door engagement surface, and wherein a coefficient of friction between the latch engagement surface and the door engagement surface when engaged is between about 0.7 and about 0.8, wherein the latch engagement surface is a first textured metal surface and the door engagement surface is a second textured metal surface, and wherein the engagement of the first textured metal surface and the second textured metal surface forms the coefficient of friction between the latch engagement surface and the door engagement surface; and an actuator configured to rotate the door latch between an unlocked position allowing for selective access of the oven compartment and a locked position preventing access to the oven compartment by engaging the latch engagement surface with the door engagement surface, wherein the door latch is in the locked position when a cleaning cycle of said oven is active.

8. The oven of claim 7, wherein the latch engagement surface extends at about an angle of between about 80° to about 90° away from the arm to engage the door frame.

9. The oven of claim 7, wherein the latch engagement surface extends at about an angle of about 86° away from the arm to engage the door frame.

10. The oven of claim 7, wherein the coefficient of friction between the latch engagement surface and the door engagement surface when engaged is about 0.75.

11. The oven of claim 7, wherein the latching mechanism includes a door close sensor configured to sense whether the door is in a closed position, and wherein when the door close sensor senses the door is not in the closed position the actuator does not rotate the door latch to the locked position.

12. An appliance, comprising:

an appliance cabinet defining a cavity;

a door operably coupled to the appliance cabinet to allow for selective access to the cavity, the door including a door frame defining a latch aperture; and a latching mechanism operable between an unlocked position allowing for selective access to the cavity and a locked position to prevent selective access to the cavity, wherein the latching mechanism includes a door latch having an arm with a hook end defining an engagement surface and a biasing arm with a distal end that extends toward the arm of the door latch, and wherein the engagement surface is configured to engage the latch aperture of the door frame and extends at about an angle of between about 80° to about 90° away from the arm to engage the door frame.

13. The appliance of claim 12, wherein the engagement surface extends at about an angle of about 86° away from the arm of the door latch to engage the door frame.

14. The appliance of claim 12, wherein the latch aperture defines a door engagement surface, and wherein a coefficient of friction between the engagement surface and the door engagement surface when engaged is between about 0.7 and about 0.8.

15. The appliance of claim 12, wherein the latching mechanism is in the locked position when a cleaning cycle of said appliance is active.

16. The appliance of claim 12, wherein the latching mechanism includes an actuator configured to move the door latch between the unlocked position and the locked position.

17. The appliance of claim 12, wherein the latching mechanism includes a door close sensor configured to sense whether the door is in a closed position.

* * * * *